United States Patent [19]
Remerowski et al.

[11] Patent Number: 5,932,057
[45] Date of Patent: *Aug. 3, 1999

[54] METHOD OF ADHERING MILLWORK TO A WORK SURFACE

[75] Inventors: David L. Remerowski; Duane C. Shomler; Anthony T. Racca; David J. Lococo, all of Cincinnati, Ohio

[73] Assignee: Senco Products, Inc., Cincinnati, Ohio

[*] Notice: This patent is subject to a terminal disclaimer.

[21] Appl. No.: 09/064,343

[22] Filed: Apr. 22, 1998

Related U.S. Application Data

[63] Continuation-in-part of application No. 08/691,835, Aug. 5, 1996, abandoned.

[51] Int. Cl.⁶ ............................................. B32B 31/00
[52] U.S. Cl. ................. 156/272.4; 156/71; 156/272.2; 156/309.6; 219/633; 219/634
[58] Field of Search .................... 156/71, 272.2, 156/272.4, 275.5, 275.7, 276, 309.6; 219/633, 634

[56] References Cited

U.S. PATENT DOCUMENTS

| | | | |
|---|---|---|---|
| 2,393,541 | 1/1946 | Kohler | 156/272.4 |
| 3,391,846 | 7/1968 | White | 156/272.4 |
| 3,574,031 | 4/1971 | Heller, Jr. et al. | 156/273 |
| 3,612,803 | 10/1971 | Klass | 329/10.53 |
| 3,733,231 | 5/1973 | Rutkowski et al. | 156/71 |
| 3,845,268 | 10/1974 | Sindt | 219/10.77 |
| 3,846,204 | 11/1974 | Eisler | 156/275 |
| 3,996,402 | 12/1976 | Sindt | 428/140 |
| 4,029,837 | 6/1977 | Leatherman | 428/247 |
| 4,038,120 | 7/1977 | Russell | 156/71 |
| 4,420,352 | 12/1983 | Schroeder et al. | 156/89.11 |
| 4,707,402 | 11/1987 | Thorsrud | 428/328 |
| 4,749,833 | 6/1988 | Novorsky et al. | 219/10.43 |
| 5,433,804 | 7/1995 | Nottingham et al. | 156/71 |
| 5,500,511 | 3/1996 | Hansen et al. | 219/633 |

FOREIGN PATENT DOCUMENTS

| | | |
|---|---|---|
| 321432 | 3/1975 | Austria . |
| 0461979 | 6/1991 | European Pat. Off. . |
| 1558393 | 4/1970 | France . |
| 63-221032 | 9/1988 | Japan . |
| 63-120786 | 10/1988 | Japan . |
| 63-273682 | 3/1989 | Japan . |
| 04093455 | 7/1992 | Japan . |
| 08296282 | 3/1997 | Japan . |

*Primary Examiner*—James Sells
*Attorney, Agent, or Firm*—Jerrold J. Litzinger

[57] ABSTRACT

A clean, neat and effective method for adhering millwork to a work surface entails placing adjacent to the surfaces to be joined a device which comprises: a target element contiguous with a heat activatable adhesive material said target element being absorbent of electromagnetic waves which are convertible to heat energy to activate said adhesive material, holding said surfaces together, and exposing said device to electromagnetic waves to produce heat sufficient to activate the adhesive material to effect a bonded relationship between the millwork and the work surface.

12 Claims, No Drawings

METHOD OF ADHERING MILLWORK TO A WORK SURFACE

CROSS REFERENCE TO A RELATED APPLICATION

This application is a continuation-in-part of U.S. patent application Ser. No. 08/691,835 filed on Aug. 5, 1996, abandoned.

BACKGROUND OF THE INVENTION

This disclosure relates to the installation of millwork by adhesive attachment. Millwork is the term used to describe products, which are primarily manufactured from lumber in a planing mill or wood working plant; such as moldings, door frames and entrances, blinds and shutters, sash and window units, doors, stairwork, mantels and porch work. Articles of furniture such as cabinets and case goods can also be characterized as mill work, especially when the millwork dominates the appearance of the article. Furniture and cabinet millwork such as shelf edge banding, toe board, trim panels, scribe moulding, chair front panels, and bead moulding are both decorative and functional in nature. While adding visual appeal, contrast and style, they are also used to provide a seamless continuity to adjoining parts, provide a wear surface, act as drawer handle pulls or door pulls and to affix upholstery and fabric. Successful and defect-proof attachment of these finish mouldings is critical as it is often the last stage in the assembly process. An improperly driven power nail or staple can cause significant damage to the article which must then be reworked at significant cost and production delay. The disclosed method can be used to attach millwork and also allow it to be adjusted perfectly.

Millwork is usually attached to the wall, ceiling or floor of a structure; but it is also frequently attached to other pieces of millwork when it is desirable to effect what is called a built-up assembly. For purposes of this disclosure, when one piece of millwork is attached to a second piece of millwork, that second piece becomes the work surface. Traditionally, in all of these instances of attachment, it is typical to employ fastening devices such as nails, staples, dowels, screws, tacks and brads. However, almost by definition, these fastening devices leave holes in the millwork, which must be covered or painted over; and the fastening tools frequently damage or at least leave distracting marks on the surface of the millwork. And, in modular and mobile home constructions, it is not uncommon for traditional fasteners to work loose during transit. This results, at the very least, in a nuisance that detracts from the appearance of the finished product and in the added expense of repair.

Not surprisingly then, others have experimented with alternatives to traditional fastening devices for attaching construction materials to a work surface.

DESCRIPTION OF THE PRIOR ART

U.S. Pat. No. 4,038,120 to Russell describes the use of an energized heating element or wire to heat a hot melt glue resulting in adhesion between contiguously assembled panels. The reference method involves heating a glue-coated wire to liquefy the glue producing a cohesive state and facilitating the assembly of panels. This method is particularly useful for introducing a cohesive material (glue) to an area of limited accessibility (groove), but the heating element (wire) requires the direct application of energy (electricity) to provide the heat to melt glue.

U.S. Pat. No. 3,574,031 to Heller et al. describes a method and material for welding thermoplastic bodies by using a susceptor between the bodies to be joined. The susceptor sealant is characterized by having particles, heatable by induction, dielectric or radiant energy, dispersed in a thermoplastic carrier compatible with the thermoplastic sheets to be welded. The welding of the thermoplastic sheets is effected by exposing the susceptor sealant to heat energy, softening the carrier material and joining all thermoplastic materials.

U.S. Pat. No. 3,996,402 to Sindt relates to the assembly of sheet materials by the use of a fastening device utilizing an apertured sheet of eddy current-conducting material sandwiched between coatings of hot-melt glue. An induction heating system is activated causing eddy current heating in the EC-conducting material with consequent melting of the hot-melt glue thus resulting in fusion and, ultimately, bonding of the sheet materials in accordance with the desired construction.

SUMMARY OF THE INVENTION

The presently disclosed method of adhering millwork to a worksurface is distinguished from, and improves upon, the prior art by utilizing a device to be placed adjacent to the surfaces to be joined which comprises a target element contiguous with a heat activatable adhesive material said target element being absorbent of electromagnetic waves which are convertible to heat energy for activating the adhesive material, holding said surfaces together, and exposing said device to electromagnetic waves to produce heat sufficient to activate the adhesive material to effect an adhesive bond between the millwork and the work surface.

DESCRIPTION OF THE PREFERRED EMBODIMENT

Moldings are decorative strips of wood or plastic that are designed to perform useful functions as well provide visual enhancements to a work surface. For example, window and door casings cover the gap between the jamb and the wall covering, and they also make the installation more rigid.

There are as many kinds of moldings as there are uses and designs. For floors there are base, shoe and quarter round moldings. For walls there are chair rails including cap, casing and stop moldings. For ceiling treatments there are crown, cove, inside corner, base, casing cap and stop moldings. Other moldings include bed and cove moulds, door and window stops, mullion casing, battens, glass beads, drip caps, apron and stool moldings and picture and screen moldings. All of these moldings, as well as all other forms of millwork, can be easily and securely affixed to a work surface according to the instantly disclosed method.

Looking at the adhesive device employed in the disclosed method in greater detail, we see that the target element must, for the most part, be fashioned from materials or substances that are not transparent to electromagnetic waves. Indeed, the target element will necessarily be constructed of a composition that will absorb electromagnetic waves. Once absorbed by the target element, these waves will produce magnetic hysteresis and eddy currents resulting in heat energy which will melt or activate the contiguous adhesive material.

A suitable device is taught in U.S. application Ser. No. 08/689,180 entitled Adhesive Device which was filed on Aug. 5, 1996, and is assigned to the assignee of the present invention. This application is hereby incorporated by reference into the present application.

Typically, the target element will be fashioned from metallic materials such as steel, aluminum, copper, nickel or amalgams thereof which have proven utility and are readily available; although, some semi-metallic materials such as carbon and silicon are also known to be suitable for the absorbtion of electromagnetic waves.

The target element can assume any form or shape consistent with the overall configuration of the adhesive device. Frequently, the target element will be presented as a metallic foil or strip, and, in some instances, it will be more effective to present the target element in the form of a fiber of an electromagnetic absorbable material. The point to be made is that the target element need only be fashioned from a material reasonably impervious to, and absorptive of, electromagnetic waves.

In use, the adhesive device needs to be situated adjacent to the millworked article and the work surface. Typically, the millworked article will be wood, plastic, ceramic, fiber board or any of a variety of composite materials. As a practical matter, of course, the millworked article needs to be transparent to electromagnetic waves. Some materials will be more transparent than others, and empirical adjustments can and will be made to modulate the quantity and intensity of electromagnetic wave energy needed to optimally activate the adhesive material.

In many instances, it will be sufficient for the adhesive device simply to be placed adjacent to the millworked article and the work surface. In other construction or assembly situations, it will be necessary to make some arrangements or take additional steps to make sure the adhesive device remains in place prior to activation. Such an additional step need be little more than introducing an additional attachment element such as a small pressure sensitive adhesive area on the surface of the device. Simpler means for positioning the device prior to activation might entail clamping, tacking, stapling, spiking or even snap-fitting by slotting the millworked article and grooving the work surface to make sure the adhesive device is situated and activated in the most effective and, therefore, most desirable location. But these measures, of course, would be optional procedures and in no way essential to the performance of the device in its broadest typical and routine applications.

When desirably situated, the adhesive device is ready to be exposed to electromagnetic waves, produced by and emanating from a generator powered by a source of alternating electric current. The generator can be held in a fixed position for assembly-line production or designed to be manipulated so as to quickly and easily pass over, around or near the strategically "hidden" device while emitting electromagnetic waves which will penetrate the "transparent" millworked article, be absorbed by the target element, be converted to heat energy, activate the adhesive material resulting in a bonded relationship between the millwork and the work surface.

To elaborate, somewhat, heat is produced in the conductive target element by two mechanisms: eddy current resistive heating and magnetic hysteresis. Eddy current resistive heating applies to all conductive materials and is produced in the target element by the electromagnetic waves emanating from the generator. The heat resulting from magnetic hysteresis is observed only in magnetic materials. As the electromagnetic field produced by the generator reverses polarity, the magnetized atoms or molecules in the target element also reverse. There is an energy loss in this reversal which is analogous to friction: this energy loss is magnetic hysteresis. The "lost" energy is quickly converted to heat and conducted by the target material to the contiguous, and frequently enveloping, heat-activatable adhesive material to initiate adhesion.

While the aforementioned heating mechanisms apply to most forms of absorbent target materials, there are factors which favor the use of a continuous, non-perforated metallic foil. These factors make foil targets having no apertures heat faster, more efficiently, and safer than other forms.

In the eddy current resistive heating mechanism, the foil presents a larger target area; thus, more of the EM field is absorbed when compared to either particles or mesh. Thus, for a given EM field strength, the foil target heats more rapidly. Also, the foil allows the eddy currents to have an unobstructed current loop path. Meanwhile, particles are effectively unheatable by eddy currents since the gaps between particles do not allow a current loop path. In meshes, the current loop path is disrupted by the mesh which has the effect of regional uneven heating and localized hot spots.

In the magnetic hysteresis heating mechanism, the target must be formed of magnetically susceptible materials such as iron, nickel, cobalt, and compounds containing these elements. Magnetic hysteresis takes place each time the EM field reverses, thus higher heating rates are observed at higher frequency. Adhesives which are loaded with magnetically susceptible powders are generally heated at or above 10 megahertz.

The use of a foil target material allows a weaker EM field at a lower frequency than either meshes or particles. This yields several benefits. The EM field generator is smaller, lighter, and requires lower input energy. The lower frequency is also safer and allows operation without special guarding or other safety provisions. The preferred range for this invention is 50 kilohertz to 900 kilohertz; ideally, the frequency range is between 150 kilohertz and 300 kilohertz. The IEEE (Institute of Electrical and Electronic Engineers) standard C95.1-1991 refers to human safety for electromagnetic field exposure. This standard has also been adopted by the ACGIH (American Conference of Governmental and Industrial Hygenists) for "Biological Exposure Indices" 1996.

When heated to the necessary temperature, the adhesive material will liquefy or become heat-activated, attach itself to the surfaces to be joined and, on cooling, create an adhesive relationship between the millworked article and the work surface.

Two adhesion mechanisms, hot-melt and heat-activated cure, are proposed for use with the disclosed device. Both mechanisms are initiated by heat emanating from the target element. Hot-melt adhesives are solid at ambient temperatures, but melt or liquefy when the temperature is elevated by, for instance, heat accumulating in the target element. The melted adhesive "wets" the adherends and, in the case of porous, foraminous, or fibrous adherends, penetrates the surface of the pieces to be bonded. As the adhesive cools, the adherends and adhesive are bonded by the electrostatic attraction of polar molecular groups. In the case of porous, foraminous, or fibrous adherends, mechanical interlocking can contribute to bond strength. Note that for the hot-melt mechanism, the bonding is reversible. Thus by repeating the induction heating procedure, the bond can be undone and the adherends separated. The ability to reverse the adhesion and separate fixed millwork is not a trivial attribute. In addition to the obvious advantage of being able to reassemble or repair misaligned millwork, it may also desirable to be able to disassemble affixed millwork to facilitate serviceability and repair.

Heat-activated curing adhesives are also solid and easy to manipulate at ambient temperatures, but when the adhesive temperature is elevated by, for example, the heat emanating from the target element, a chemical reaction is initiated. This reaction involves a cure or crosslinked bonding either within the adhesive or between the adherends. Such bonds are typically irreversible. Frequently, a heat-activated curing adhesive bond will demonstrate an electrostatic attraction between the adhesive and the adherends and a crosslinked bond within itself.

While the foregoing is a complete description of the disclosed method, numerous variations and modifications may also be employed to implement the purpose of the invention. And, therefore, the elaboration provided should not be assumed to limit the scope of the invention which is intended to be defined by the appended claims.

What is claimed is:

1. A method of assembling millwork to a work surface, which comprises: placing adjacent to the surfaces of the millwork and the work surface pieces to be joined a device comprising a target element composed of a continuous, non-perforated metallic foil strip contiguous with a heat activatable adhesive material, said target element being absorbent of and not consumable by electromagnetic waves which are convertible to heat energy to activate said adhesive material, holding said millwork and said work surface together, and exposing said device to electromagnetic waves to produce heat sufficient to activate the adhesive material to effect a bonded relationship between the millwork and the work surface.

2. The method of claim 1, wherein the frequency of the electromagnetic waves is between 50 kilohertz and 900 kilohertz.

3. The method of claim 1, wherein said foil strip is non-magnetic.

4. The method of claim 1, wherein said foil strip is manufactured from a metallic material taken from a group consisting of aluminum, copper, and steel.

5. The method of claim 1, wherein said heat activatable adhesive material is a hot-melt adhesive.

6. The method of claim 1, wherein said heat activatable adhesive material is a heat-activated curing adhesive.

7. The method of claim 1, wherein said heat energy is generated by eddy currents.

8. The method of claim 1, wherein said heat energy is generated by hysteresis.

9. The method of claim 1, wherein the frequency of the electromagnetic waves is between 150 kilohertz and 350 kilohertz.

10. The method of claim 1, wherein said method is reversible.

11. The method of claim 1, wherein said method is practiced in a normal atmosphere.

12. A method of adhering millwork to a work surface, which comprises: placing adjacent to the millwork and the work surface to be joined a device comprising a target element composed of a metallic foil strip contiguous with a heat activatable adhesive material, said target element being absorbent of and not consumable by electromagnetic waves which are convertible to heat energy to activate said adhesive material, holding said millwork and said work surface, and exposing said device to electromagnetic waves having frequency between 150 kilohertz and 300 kilohertz to produce heat sufficient to activate the adhesive material to effect a bonded relationship between said millwork and said work surface.

* * * * *